(12) United States Patent
Bowerman et al.

(10) Patent No.: US 6,327,928 B1
(45) Date of Patent: Dec. 11, 2001

(54) STEERING COLUMN SHIFTER ASSEMBLY

(76) Inventors: Brian C. Bowerman, 67 W. Chicago St., Quincy, MI (US) 49082; Patrick D. Gaukel, 466 Cranson Rd., Bronson, MI (US) 49028

(*) Notice: Subject to any disclaimer, the term of this patent is extended or adjusted under 35 U.S.C. 154(b) by 0 days.

(21) Appl. No.: 09/414,354

(22) Filed: Oct. 7, 1999

Related U.S. Application Data

(60) Provisional application No. 60/105,416, filed on Oct. 23, 1998.

(51) Int. Cl.[7] .............................. B62D 1/18; B60K 20/06
(52) U.S. Cl. ................................ 74/473.31; 74/473.15; 74/487; 74/493
(58) Field of Search .............................. 74/473.3, 473.31, 74/473.32, 493, 473.15, 487, 501.6

(56) References Cited

U.S. PATENT DOCUMENTS

| | | | |
|---|---|---|---|
| 3,737,003 | * | 6/1973 | Beals et al. .......................... 74/493 |
| 4,291,896 | * | 9/1981 | Koch ................................... 74/493 |
| 4,664,221 | * | 5/1987 | Loney et al. ......................... 74/493 |
| 4,682,787 | * | 7/1987 | Ruhter et al. ......................... 74/493 |
| 5,280,732 | * | 1/1994 | Katsumata et al. ............... 74/473.32 |
| 5,632,353 | * | 5/1997 | Kimberley ............................ 74/493 |
| 6,055,881 | * | 5/2000 | Oda ................................. 74/473.32 |

FOREIGN PATENT DOCUMENTS 10-86692 * 4/1998 (JP).

* cited by examiner

Primary Examiner—David A. Bucci
Assistant Examiner—William C Joyce
(74) Attorney, Agent, or Firm—Miller, Johnson, Snell & Cummisky, P.L.C.; Barry C. Kane

(57) ABSTRACT

A shifter assembly for use on tilting and/or telescoping steering columns includes a cam connected to the steering column, and a crank spaced from the cam and connected to a fixed portion of the vehicle such as the lower portion of the steering column. A gear shift lever is provided which is connected to the cam. A parallel cable linkage assembly interconnects the cam and crank.

21 Claims, 2 Drawing Sheets

STEERING COLUMN SHIFTER ASSEMBLY

CROSS-REFERENCE TO RELATED APPLICATIONS

This application relates to and claims priority from U.S. provisional patent application Ser. No. 60/105,416, filed Oct. 23, 1998, the specifications of which are incorporated herein by reference.

BACKGROUND OF THE INVENTION

1. Field of the Invention

This invention relates to vehicle gear shift assemblies, and particularly to gear shift assemblies mounted to a steering column which tilts and/or telescopes.

2. Discussion of the Related Art

Since the advent of tilting and telescoping of steering columns for vehicles, manufacturers have struggled with how to mount the gear shift assembly in the vehicle. Many mount the shifter on the steering column below the point where the column tilts and/or telescopes. The result is that the gear shift lever is rarely near the steering wheel where the operators hands are positioned. Others have experimented by placing the gear shift lever on the dash board. This is particularly true of older model passenger vehicles and some contemporary heavy trucks. Again the same ergonomic considerations are present—that is the operators hands are not conveniently near the gear shift lever. One ergonomic option used by many manufacturers is to place the gear shift lever on the floor console next to the operators thigh or knee. Although this is in many cases a good location, there are instances when the floor space is preferred to be open. This necessitates placing the levers in front of the operator.

One possible solution is to place the gear shift lever on the tilt or telescoping upper portion of the steering column using the same technology used for the steering column shaft assembly used on tilting and telescoping steering columns. Two coaxially translating tubes are provided for the telescoping portion. The gear shift lever could be attached either to one of the telescoping tubes or to a universal joint at the end of the telescoping tubes to accommodate the tilt and/or telescope action of the steering column. The lower end of the telescoping tubes could be connected to a conventional gear shift linkage. The problem associated with this type of system is the sometimes excessive amount of lash commonly associated with the universal joint and the coaxially telescoping tubes.

The steering column shifter assembly described herein solves all of the problems associated with gear shift assemblies on tilting and/or telescoping steering columns.

SUMMARY OF THE INVENTION

A shifter assembly is provided for a steering column wherein an upper housing is configured to tilt and/or telescope with respect to a lower housing. The shifter assembly includes a lever assembly mounted to the upper housing, a cam assembly also mounted to the upper housing and coupled by a linkage to the lever assembly such that actuation of the lever assembly moves the cam assembly between a first and second position. A second cam assembly is also provided, mounted to the lower housing, and interconnected to the first cam assembly by two cables. The two cables are sufficient in length to permit the full range of tilt and telescopic motion of the upper housing relative to the lower housing. The two cables are arranged such that movement of one cam assembly pulls the other cam assembly to a corresponding position. The second cam assembly is in turn connected to a conventional gear shift linkage for shifting the vehicle transmission.

The advantages provided by this invention include an easier shifting action of the shifter because the two cables work in a pull-pull relationship providing a positive displacement of the linkage without the lash of prior systems. Additionally, the flexibility of the two cables interconnecting the first and second cam assemblies provides an infinite range of tilt and telescope action, limited only by the length of cable. The two cable system is also easier to manufacture, resulting in savings on parts and labor. Lastly, the two cable system is extremely versatile and adaptable to substantially any situation.

These and other features, advantages and objects of the present invention will be further understood and appreciated by those skilled in the art by reference to the following specification and appended drawings.

DETAILED DESCRIPTION OF VARIOUS EMBODIMENTS

Figure 1:
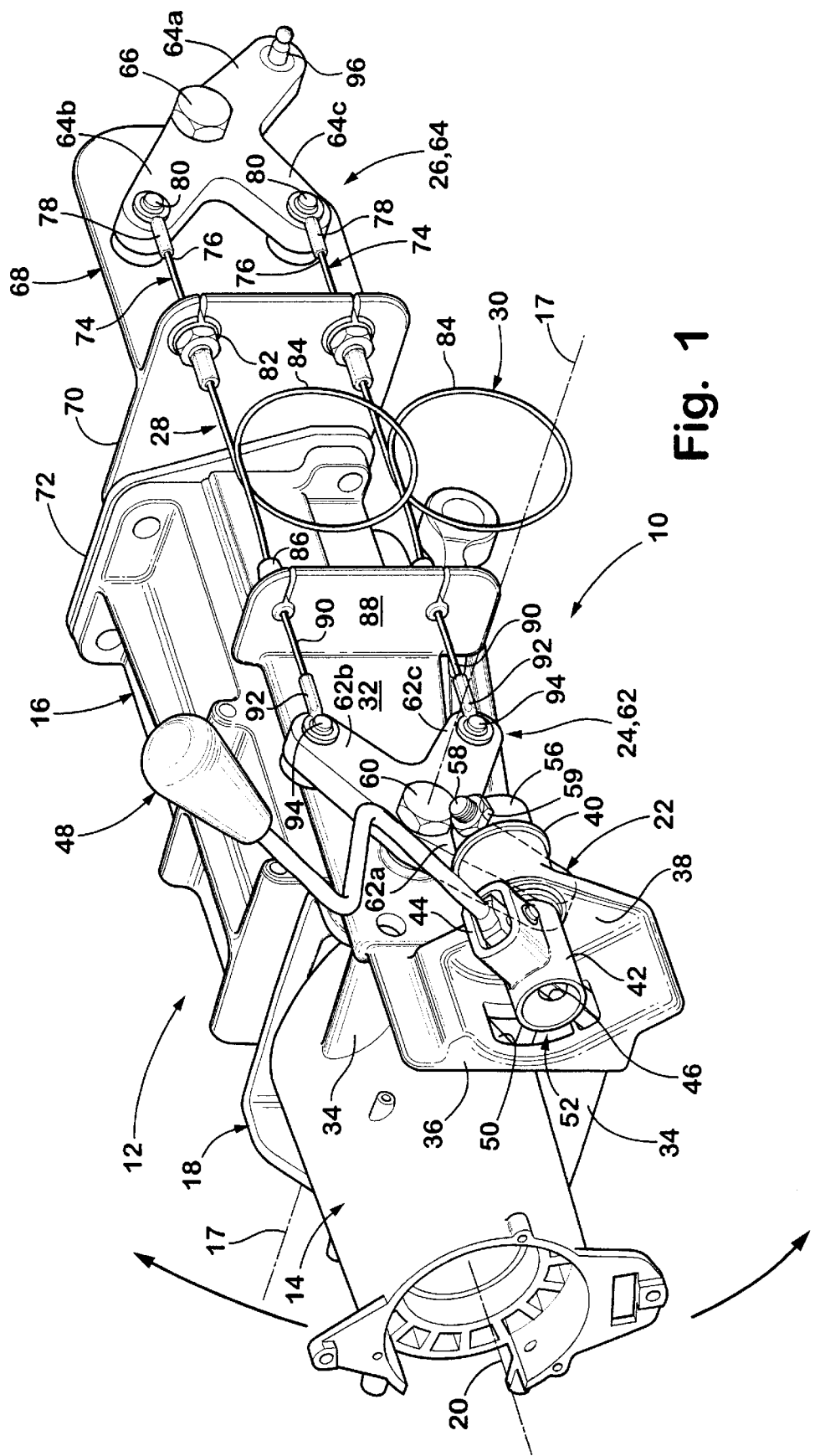
FIG. 1 is an oblique view of one form of a steering column shifter assembly embodying the invention and mounted on a tilting and telescoping steering column.

For purposes of the following description, the terms "upper," "lower," "left," "rear," "front," "vertical," "horizontal" and derivatives of such terms shall relate to the invention as oriented in FIG. 1. However, it is should be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Specific dimensions and other physical characteristics relating to the embodiments disclosed herein are not to be considered as limiting, unless the claims expressly state otherwise.

Figure 2:
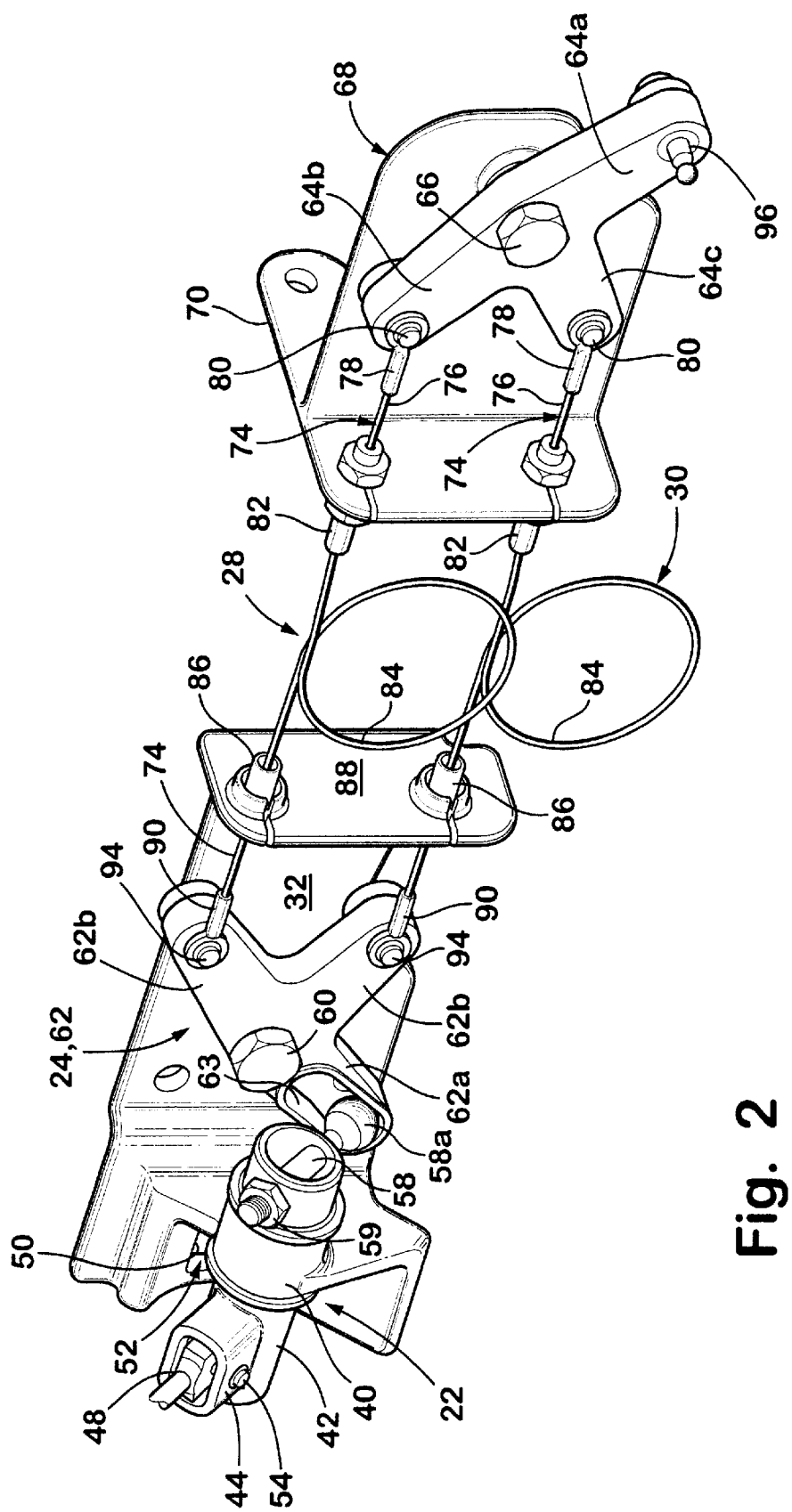
FIG. 2 is another oblique view of the steering column shifter assembly shown in FIG. 1.

Referring to the FIGS. 1 and 2, a shifter assembly 10 is shown for use on a tilting and/or telescoping steering column assembly 12. The column assembly 12 includes an upper housing 14 pivotally coupled to an upper end of a lower housing 16 in a manner to permit the upper housing 12 to tilt with respect to the lower housing 16 about axis 17. The column assembly 12 includes a coaxial carriage 18 slidably disposed within lower housing 16 and configured to axially translate along a longitudinal axis 20 with respect to the lower housing 16. Such a column assembly 12 is disclosed in greater detail in copending U.S. Provisional Patent Application Serial No. 60/101,789, filed Sep. 25, 1998, the specification of which is incorporated herein by reference.

The shifter assembly 10 generally includes a gear shift lever assembly 22 mounted to the upper housing 14, a cam or crank assembly 24 also connected to the upper housing 14, and interconnected to the gear shift lever assembly 22, and a crank assembly 26 interconnected to the lower housing 16. The first cam crank assemblies are interconnected to each other by a first and second cable assemblies 28 and 30, respectively.

In the embodiment shown, the gear shift lever assembly 22 and cam assembly 24 are both mounted to a base member 32 which in turn is mounted to bosses 34 extending from the upper housing 14. At a first end 36 of the base member 32 is a flange 38 supporting a sleeve 40 configured to coaxially receive and journal gear shift lever barrel 42 therein. Extending substantially at a right angle from barrel 42 is a tubular member 44 located diametrically opposite and aligned with an opening 46 extending through the opposite side of the barrel. One end of a gear shift lever 48 extends through tubular member 44 and through opening 46 to be received in a slot 50 extending through base member 32. Slot 50 includes aplurality of detents or dividers 52 for positioning the end of the lever 48 therein. Lever 48 is pivotally retained in the tubular member 44 by a pin 54 extending transversely through tubular member 44 and lever 48. The opposite end 56 of barrel 42 journaled within sleeve 40 is interconnected to the first cam assembly 24 by a shifter pin 58 such that rotation of barrel 42 imparts a rotation of first cam assembly 24 about an axis defined by bolt 60.

Cam assembly 24 includes a multi-lobed cam or bell crank 62 pivotally coupled by bolt 60 to the base 32. The cam 62 includes a polarity of lobes identified as 62a, 62b, and 62c, of which lobe 62a includes an oval slot 63 receiving one end 58a of the shifter pin 58. The end of the shifter pin within slot 63 is preferably spherical and positioned to slide within slot 63 as barrel 42 rotates. The opposite end of shifter pin 58 is held within barrel 42 by a nut 59 or other suitable fastener. Lobe 62b extends in substantially an opposite direction than lobe 62a while lobe 62c extends in a third direction set at a predetermined angle with respect to the first and second lobes 62a and 62b. By mounting the lever assembly 22 and cam assembly 24 on base member 32, a change in the tilt angle of the upper housing 14 relative to the lower housing 16 also results in a change in the orientation of lever assembly 22 and cam assembly 24 relative to the lower housing 16.

Crank assembly 26, briefly mentioned above, includes a second bell crank 64, preferably in the form of a mirror image of bell crank 62 and includes a plurality of lobes 64a, 64b, and 64c. Bell crank 64 pivots about a point defined by bolt 66 which pivotally couples bell crank 64 to mounting plate 68. In one embodiment, mounting plate 68 is T-shaped wherein cross member 70 is mounted to a lower end 72 of the lower housing 16. In a preferred embodiment, mounting plate 62 is attached to the lower housing 16 by fasteners to enable repair and replacement of the respective parts. However, it is to be understood that mounting plate 68 may constitute an integral part of the lower housing in the form of a single casting, or attached by welding or other permanent attachment method.

Interconnecting the two bell cranks 62, 64 are the two cable assemblies 28 and 30 mentioned above. First cable assembly 28 includes a length of cable 74 having a first end 76 attached to a grommet 78 which in turn is pivotally coupled to lobe 64b by pin 80. Cable 74 extends through a conventional cable sheathing or sleeve (not shown) wherein one end of the sheathing is retained by connector 82 to the flange of cross member 70. The cable and sheath extend in a loop 84 wherein the opposite end of the sheathing is held by coupler 86 mounted in flange 88 extending from base member 32. The opposite end 90 of cable 74 is also fixed with a grommet 92 which is pivotally coupled to lobe 62b by pin 94. Lobes 62c and 64c are interconnected in a similar fashion by cable assembly 30, the details of which will not be repeated for the sake of brevity. The coupling between the two bell cranks 62 and 64 defines a parallel linkage wherein clockwise rotation of bell crank 62 by shifter pin 58 causes cable assembly 30 to pull on lobe 64c and rotate cam 64 in a similar clockwise direction. Counterclockwise rotation of bell crank 62 results in a counter-clockwise rotation of bell crank 64. The loop of extra cable 84 provided in each cable assembly 28 and 30 permits the axial telescopic extension and retraction of carriage 18 with respect to lower housing 16 to move the steering wheel closer or further away from the operator. The extra loop 84 of cable also allows tilting of upper housing 14 and base 32 relative to lower housing 16 and mounting plate 68.

In a preferred embodiment, two of the three principal components—the upper and lower housing—of steering column assembly 12 are preferably made from a polymeric material to reduce the weight of the overall assembly. Additionally, base member 32 as well as mounting plate 68 may also be made from the same material. It is contemplated that this same polymeric material may be used to construct the entire housing and carriage components. It is further contemplated that alternate materials such as aluminum or steel may also be used. Lever 48 as well as bell cranks 62 and 64 are preferably formed from steel, aluminum or other alloy. Cables 74 interconnecting bell cranks 62 and 64 are preferably formed from twisted wire and may be relatively light gage. A suitable lubricating compound may be placed on cable 74 to reduce friction or any binding that may occur at couplers 82 and 86 associated with a change in he tilt angle of the column.

In operation, the operator pulls on the large end of gear shift lever 48 to pivot the lever about pin 54 and raise the opposite end above any detent 52 in slot 50. The operator is then free to move the gear shift lever to the desired position. Upon rotation of the gear shift lever 48, barrel 42 rotates which moves pin 58 to rotate bell crank 62. Defending upon the rotational direction of bell crank 62, cables 74 in cable assemblies 28 and 30 will pull on the opposite lobe of bell crank 64, causing it to turn in a likewise direction. A conventional gear shift linkage (not shown) is attached to pin 96 extending from lobe 64a which then causes the transmission in the vehicle to shift to the appropriate position.

When the operator wishes to change the tilt angle of the upper housing 14 of the steering column 12, lever assembly 22 as well as cam assembly 24 move in unison because of the coupling of base member 32 to the upper housing 14. Likewise, if the operator wishes to telescope the steering column, the lever and cam assemblies also move because of this same coupling relationship. The flexibility provided by the cable assembly 28 and 30 permits these relative changes in position of the steering column assembly without the difficultly associated with more ridged couplings.

The above description is considered that of the preferred embodiments only. Modifications of the invention will occur to those skilled in the art and to those who make or use the invention. Therefore, it is understood that the embodiment shown in these drawings and described herein are merely for illustrative purposes and not intended to limit the scope of the invention, which is defined by any claims in a subsequent or related application and interpreted according to the principals of patent law, including the doctrine of equivalence.

We claim:

1. A shifter assembly for a steering column, the steering column having an upper housing and a lower housing coupled to the upper housing, said shifter assembly comprising in combination:

a cam assembly adapted to be pivotally connected to the upper housing;

a crank assembly adapted to be pivotally connected to the lower housing;

a gear shift lever connected to said cam assembly; and a flexible linkage interconnecting said cam assembly to said crank assembly.

2. The assembly as defined in claim 1, wherein said cam assembly includes a crank arm.

3. The assembly as defined in claim 1, wherein said crank assembly includes a bell crank.

4. The assembly as defined in claim 1, wherein said flexible linkage includes one of a cable, a chain, and a wire.

5. The assembly as defined in claim 1, wherein said cam assembly pivots about a predetermined axis with respect to said crank assembly.

6. The assembly as defined in claim 1, wherein said cam assembly translates along an axis with respect to said crank assembly which is parallel to a longitudinal axis of the lower housing.

7. The assembly as defined in claim 1, further comprising:

a base member adapted to couple said gear shift lever and said cam assembly to the upper housing; and a mounting plate adapted to interconnect said crank assembly to the lower housing.

8. A gear shift lever assembly for a steering column, the steering column having a first housing, a second housing coupled to the first housing in a manner to permit at least one of pivotal movement and telescopic movement between the first housing and the second housing, the gear shifter assembly comprising:

a lever assembly configured to be mounted to the second housing;

a cam assembly configured to be mounted to the second housing and interconnected to said lever assembly;

a crank assembly configured to be mounted to the first housing; and a parallel linkage assembly interconnecting said cam assembly to said crank assembly wherein actuation of said lever assembly moves said crank assembly.

9. The assembly as defined in claim 8, wherein said parallel linkage is flexible and adapted to permit translational movement of said cam assembly relative to said crank assembly.

10. The assembly as defined in claim 8, wherein said lever assembly includes a pin having an end received within a slot defined within said cam assembly.

11. The assembly as defined in claim 8, wherein said cam assembly includes at least one crank arm.

12. The assembly as defined in claim 8, wherein said lever assembly includes:

a sleeve;

a barrel received within said sleeve; and a gear shift lever extending transversely through said barrel and having an end received within an elongate slot, said slot having a plurality of detents for retaining said end of said gear shift lever at one of a plurality of preferred positions.

13. The assembly as defined in claim 8, wherein said cam assembly is adapted to move about a predetermined axis with respect to said crank assembly in association with pivotal movement between the first and second housing of the steering column.

14. The assembly as defined in claim 8, wherein said cam assembly is adapted to translate with respect to said crank assembly in unison with the telescopic movement of the steering column.

15. The assembly as defined in claim 8, further comprising:

a base member configured to interconnect said gear shift lever and said cam assembly to the second housing of the steering column; and a mounting plate configured to attack said crank assembly to the steering column first housing.

16. The assembly as defined in claim 9, wherein said parallel linkage includes loops to permit longitudinal movement of said parallel linkage.

17. A steering column mounted gear shift assembly, comprising in combination:

a first mounting plate for attachment to a steering column at a first location;

a second mounting plate spaced from said first mounting plate for attachment to the steering column at a second location;

a first crank pivotally coupled to said first mounting plate;

a lever assembly mounted on said first mounting plate and coupled to said first crank;

a second crank coupled to said second mounting plate; and a pair of flexible members interconnecting said first crank to said second crank, whereby actuation of said lever moves said first crank and said flexible member, cause a corresponding movement of said second crank.

18. The gear shift assembly as defined in claim 17, wherein said lever assembly includes:

a sleeve;

a barrel coaxially received within said sleeve;

a pin extending transversely through one end of said barrel and engaging said first crank; and a gear shift lever extending transversely through an opposite end of said barrel and having an end adapted to engage one of a plurality of detents to hold said lever in a predetermined position.

19. The gear shift assembly as defined in claim 17, wherein said flexible members include lengths of at least one of cable, wire, and chain.

20. The gear shift lever assembly as defined in claim 17, wherein said pair of flexible members permit at least one of rotational and translational movement of said first crank relative to said second crank.

21. A shifter assembly for a steering column, the steering column having a first housing interconnected to a second housing in a manner to permit at least one of a tilting and telescoping motion of said first housing relative to said second housing, the shifter assembly, comprising:

a first crank to be pivotally coupled to the first housing;

a lever to be mounted on the first housing and connected to said first crank;

a second crank to be pivotally coupled to the, second housing; and a parallel flexible linkage assembly interconnecting said first and second cranks such that rotation of said first crank by said lever produces a corresponding rotation of said second crank.

* * * * *